United States Patent
Myrtle

(10) Patent No.: US 6,865,745 B2
(45) Date of Patent: Mar. 8, 2005

(54) METHODS AND APPARATUS FOR REDUCING THE SHRINKAGE OF AN OPTICAL DISC'S CLAMP AREA AND THE RESULTING OPTICAL DISC

(75) Inventor: James Myrtle, Taylor, PA (US)

(73) Assignee: WEA Manufacturing, Inc., Olyphant, PA (US)

( * ) Notice: Subject to any disclaimer, the term of this patent is extended or adjusted under 35 U.S.C. 154(b) by 34 days.

(21) Appl. No.: 10/178,184

(22) Filed: Jun. 21, 2002

(65) Prior Publication Data

US 2003/0095497 A1 May 22, 2003

Related U.S. Application Data

(60) Provisional application No. 60/311,638, filed on Aug. 10, 2001.

(51) Int. Cl.$^7$ ............................................. G11B 17/02
(52) U.S. Cl. ..................................................... 720/724
(58) Field of Search .......................... 720/724; 369/280, 369/290, 281, 282, 275.5; 428/64.1, 64.2, 64.3, 64.4

(56) References Cited

U.S. PATENT DOCUMENTS

| | | | |
|---|---|---|---|
| 2,846,230 A | 8/1958 | Richter | |
| 3,132,866 A | 5/1964 | Nitti et al. | |
| 4,359,750 A | 11/1982 | Howe | |
| 4,633,458 A | * 12/1986 | Tiefensee | 369/275.5 |
| 4,733,388 A | * 3/1988 | Fujimoto et al. | 369/270 |
| 5,590,115 A | * 12/1996 | Kubo | 369/290 |
| 5,875,171 A | * 2/1999 | Albrecht et al. | 369/281 |
| 5,935,673 A | 8/1999 | Mueller | |
| 5,999,513 A | * 12/1999 | Arakawa et al. | 369/282 |
| 6,195,234 B1 | * 2/2001 | Sundaram et al. | 360/135 |
| 2002/0075794 A1 | * 6/2002 | Park | 369/282 |

FOREIGN PATENT DOCUMENTS

| | | | |
|---|---|---|---|
| EP | 1291874 A2 | * | 3/2003 |
| JP | 62248180 A | * | 10/1987 |
| JP | 02-083834 | * | 3/1990 |
| JP | 07065472 A | * | 3/1995 |
| JP | 09017037 A | * | 1/1997 |
| JP | 10-106044 | * | 4/1998 |
| WO | WO 98/10418 | | 3/1998 |
| WO | WO 98/47140 | * | 10/1998 |

* cited by examiner

*Primary Examiner*—Tianjie Chen
(74) *Attorney, Agent, or Firm*—Fish & Neave IP Group of Ropes & Gray LLP; Robert R. Jackson; Patrick J. Zhang

(57) ABSTRACT

An improved optical disc is provided that comprises a substantially transparent substrate, one surface of which carries optical data structures comprising pits and lands radially outward of a clamp area of the disc. In the clamp area a protrusion structure is provided above the first surface to create a clamp thickness greater than the thickness of the rest of the disc. In accordance with the principles of the present invention, only a portion of the clamp area is covered by the protrusions, which emulate a disc having a clamp area of greater thickness. In order to reduce warping caused by shrinkage of material added to the clamp area, the amount of material used to form the protrusions is less than 5% of the amount of material used to form the rest of the clamp area.

8 Claims, 3 Drawing Sheets

METHODS AND APPARATUS FOR REDUCING THE SHRINKAGE OF AN OPTICAL DISC'S CLAMP AREA AND THE RESULTING OPTICAL DISC

CROSS REFERENCE TO RELATED APPLICATIONS

This application claims the benefit of provisional patent application No. 60/311,638, filed on Aug. 10, 2001, which is hereby incorporated by reference.

BACKGROUND OF THE INVENTION

This invention relates to single-substrate optical discs, such as single-substrate audio or video DVDs.

Optical discs having pits and lands that form an optical track structure on one surface are known as single-substrate optical discs, while double-substrate optical discs, in which two single-substrate discs are bonded to each other back to back, are known as dual-substrate optical discs. When a dual-substrate disc is manufactured, the clamp area is characterized by the aggregate thickness of the two bonded substrates. ("Clamp area" is the area of a DVD that is covered or engaged by the clamp mechanism of the reproducing apparatus during play-back of the DVD. The word "area" is frequently used herein to refer to what is actually a three-dimensional portion or region of an optical disc. Thus the clamp area of a disc is not just a two-dimensional surface area, but also the thickness of the disc in that two-dimensional area. A certain volume, quantity, or amount of plastic material is therefore required to make the "clamp area" of a disc.)

In an apparatus for reproducing the information recorded on an audio or video DVD, the clamp that grips the disc must be designed specifically for the thickness of the clamp area of that type of disc. The clamp area of a commercially available 80 mm DVD is usually located within the annular region having an outer radius of about 33 mm and an inner radius (defining the central aperture) of 22 mm.

A typical reproducing apparatus in commercial use today is designed for double-substrate optical audio or video DVDs. The thickness of the clamp area in such double-substrate discs is typically about 1.2 mm, which is composed of the thicknesses of the two bonded substrates, about 0.6 mm each. In order to satisfy the specifications of the clamp designed for use with double-substrate discs, the thickness of the clamp area in a single-substrate optical disc must be made substantially the same as that of a double-substrate disc. For example, if the thickness of the clamp area in a single-substrate DVD is increased to about 1.2 mm, it becomes possible to play a single-substrate 0.6 mm-thick DVD on a player designed for use with bonded 1.2 mm-thick DVDs.

A conventional way of accomplishing this object is by manufacturing an optical disc 10 (FIG. 1) having two regions 20 and 30 of different thicknesses. The first region 20 is a cylindrical region of annular cross section constituting the central portion of the optical disc 10, and the second region 30 is the remaining outer annular region of the disc. The thickness of first region 20 is greater than the thickness of second region 30. Such discs can be created by molding a hub with extra material in the clamp area of the disc, as described in International Application WO 98/10418. If additional material with a thickness of about 0.6 mm is molded onto a substrate 30 with the thickness of about 0.6 mm, the total thickness of region 20 will reach about 1.2 mm. This design makes it possible for a reproducing apparatus designed to play double-substrate DVDs to play single-substrate DVDs as well.

The prior art solution, however, has a variety of disadvantages. For example, when a disc is manufactured according to the design described above, the large amount of material used in forming the hub may cause the hub to shrink radially and vertically, pulling in material from other regions of the disc, including information-carrying regions. This warping phenomenon may negatively affect the tilt, stress, birefringence and electrical properties of the disc. Attempts at reducing this phenomenon, such as increasing cool-down time in the mold for each disc, reduce the efficiency of the disc manufacturing process.

SUMMARY OF THE INVENTION

In accordance with the principles of the present invention, the above-described warping phenomenon and its related negative effects on the manufacture and performance of the disc are reduced by altering the design of the hub structure, thereby decreasing the amount of material necessary to emulate the thickness of a double-substrate disc. For example, the solid hub of the prior art, such as the hub shown in FIG. 1 and described in International Application WO 98/10418, may be replaced by one or more relatively small protrusions located in the clamp area of the disc. These protrusions may be of various shapes, for example, spokes, bumps or rings, and may vary in number, location, shape and size. In addition to reducing the shrinkage in the hub structure, this approach results in reduced manufacturing cost by allowing faster molding of the discs and decreasing the amount of material needed to form the disc's clamp area. Furthermore, the present invention allows the production of discs with a more aesthetically pleasing appearance.

Further features of the invention, its nature and various advantages will be more apparent from the accompanying drawings and the following detailed description.

DETAILED DESCRIPTION

The invention comprises an optical disc 50 (FIGS. 2 and 3), such as an audio or video DVD, typically manufactured of plastic, one of the surfaces 52 (the upper surface in FIG. 2) of the disc having pits and lands representing data. The pits and lands are, of course, too small to be depicted in drawings having the scale employed herein. (Although "pits and lands" are generally referred to herein, it will be understood that the data recording technology may alternatively be (or may alternatively be referred to as) "bumps and lands." The phrase "pits and lands" herein will be understood to be generic to both "pits and lands" and "bumps and lands.") The objects of the present invention are accomplished by manufacturing a single-substrate optical disc 50 having one or more relatively small protrusions 60 in the clamp area.

Figure 1:
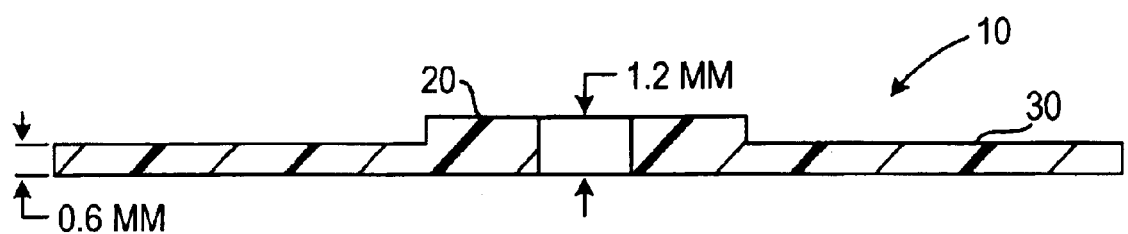
FIG. 1 is a cross-sectional view of a prior art optical disc having a hub increased in thickness by approximately 0.6 mm on the information-carrying side of the disc.
Figure 2:
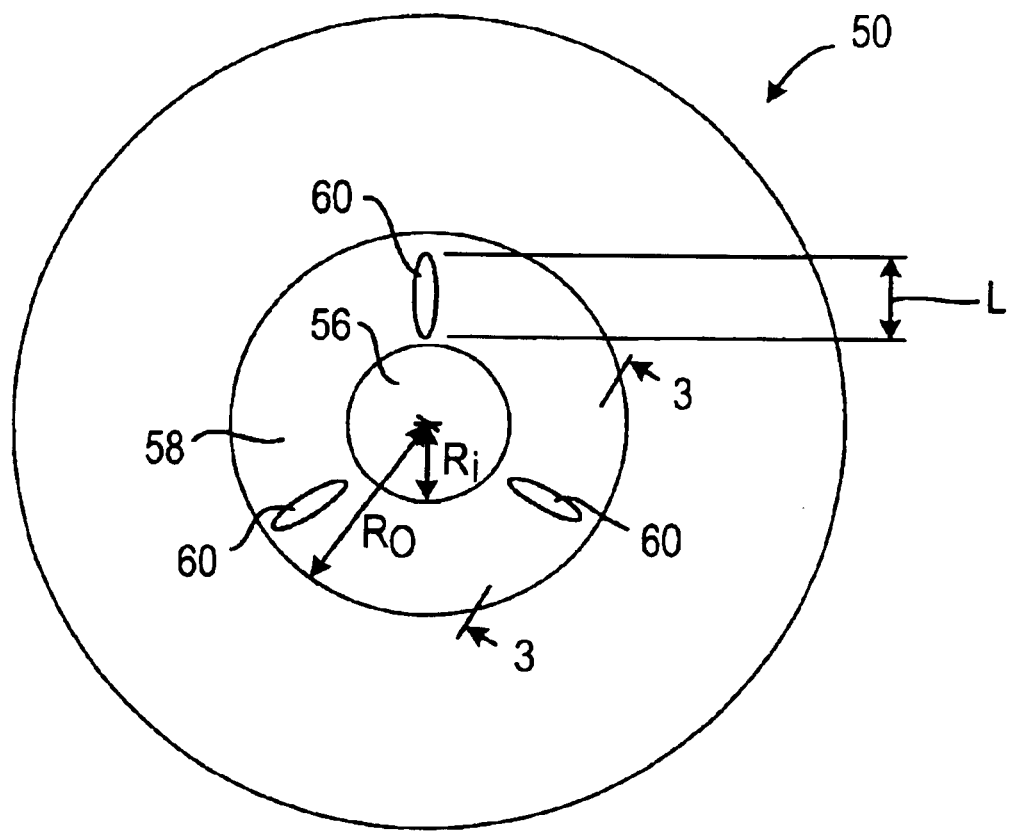
FIG. 2 is a plan view of an illustrative embodiment of an optical disc according to the present invention comprising radial, spoke-shaped protrusions in the clamp area.
Figure 3:
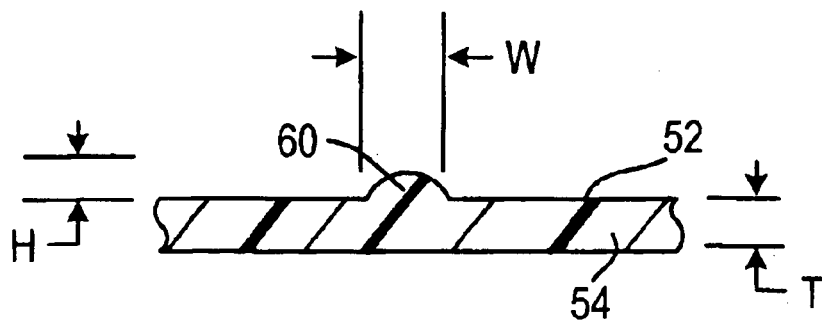
FIG. 3 is a partial cross-sectional view taken along the line 3—3 in FIG. 2.

As shown in FIGS. 2 and 3, one example of an optical disc 50 according to the present invention comprises a substantially transparent disc-shaped substrate 54, having on one side (radially outward of the clamp area) optical data storage structures comprising pits and lands and, in the clamp area, protrusions 60 of generally radial, spoke-like shape. The illustrative embodiment of the invention shown in FIGS. 2 and 3 comprises a 0.6 mm thick disc-shaped substrate 54 with three spoke-like protrusions 60, each about 6 mm long, 2 mm wide, and 0.6 mm high, in the clamp area of the disc. Spokes 60 extend generally radially of disc 50, and are equally spaced from one another in the circumferential direction around the opening 56 in the center of the disc. This particular design, comprising three spoke-like protrusions in the clamp area, has been found to achieve significant reductions in the amount of warping in the disc as compared with the prior art hub design shown, for example, in FIG. 1.

The number and the dimensions of protrusions 60 may vary, as long as the variations do not result in the accumulation of enough added material to cause an unacceptable amount of warping through shrinkage of the added material. Ideally, the protrusion structure 60 should be large enough to provide sturdy means to emulate a greater desired thickness in the clamp area, while remaining small enough to reduce the above-described warping phenomenon. Preferably, to achieve this end, the amount of material added to the disc's clamp area to form the protrusions should be less than about 5% of the amount of material used to form a conventional clamp area (that is the same thickness as the remainder of the single-substrate disc). More preferably, the amount of added material is about 1–3% of the material required for the conventional clamp area. For example, in the context of the illustrative embodiment shown in FIGS. 2 and 3, the phrase "conventional clamp area" in the two preceding sentences refers to a 0.6 mm thick clamp area 58. If the amount of material in that conventional clamp area is X, then the amount of added material in protrusions 60 is preferably no more than about 5% of X, more preferably about 1–3% of X.

Discs according to the present invention may also, or alternatively, comprise protrusions of other shapes, for example, one or more bumps or rings. These features may be combined and/or arranged in a variety of patterns. Preferably, the protrusions should be arranged symmetrically.

Figure 4:
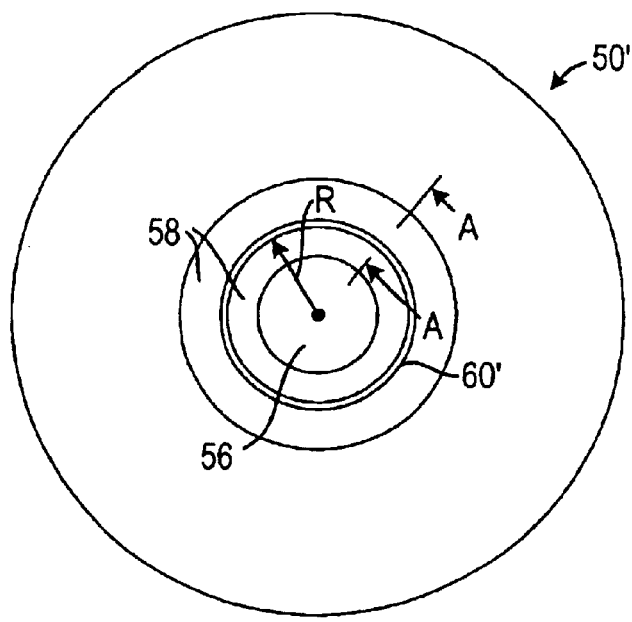
FIG. 4 is view similar to FIG. 2 showing an alternative embodiment of the invention.
Figure 5:
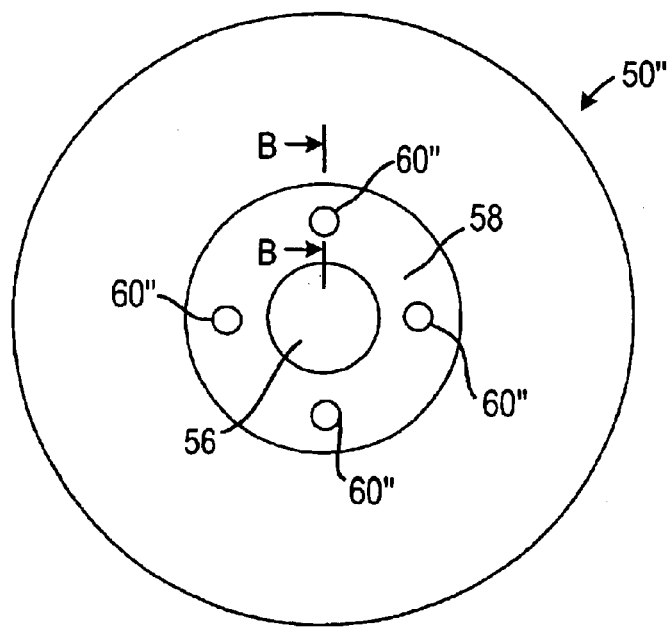
FIG. 5 is a view similar to FIG. 4 showing another alternative embodiment of the invention.

FIGS. 4 and 5 illustrate just a few examples of alternative protrusion embodiments in accordance with the invention. In FIG. 4 protrusion structure 60' is a single annular ring that is substantially concentric with the central aperture 56 in disc 50'. A partial cross section of disc 50' across ring 60' may look like FIG. 3. For example, a cross section taken along the line A—A in FIG. 4 may look like FIG. 3, with reference number 60 changed to 60'. Ring 60' is, of course, in the clamp area of disc 50'. In FIG. 5 protrusion structure 60" comprises four bumps spaced equidistantly around the central aperture 56 of disc 50". Once again, a partial cross section of disc 50" through one of bumps 60" may look like FIG. 3. For example, a cross section taken along line B—B in FIG. 5 may look like FIG. 3, with reference number 60 changed to 60". Bumps 60" are, of course, in the clamp area of disc 50".

Recapitulating the invention now in other terms, an optical disc 50/50'/50" has a central aperture 56, a clamp area 58 substantially concentrically surrounding the central aperture, and an information area 52 substantially concentrically surrounding the clamp area. Information is recorded on a first surface (the upper surface in the FIGS.) of the disc in the information area. (The reference number 52 is also sometimes used to refer to this first surface of the disc.) In clamp area 58 the disc has a protrusion structure 60/60'/60" extending above the remainder of first surface 52. The purpose of protrusion structure 60/60'/60" is to give the disc a clamping thickness (i.e., an apparent thickness to the clamping mechanism of disc-playing or disc-utilizing apparatus) that is greater than the thickness T (FIG. 3) of the remainder of the disc. However, to prevent the disc-molding problems that are described earlier in this specification, the amount of material added by the protrusion structure is preferably less than about 5% (more preferably about 1–3%) of the material used in a conventional clamp area (flat portion of the clamp area excluding the protrusion structure).

Although the protrusion structure 60/60'/60" may take any of many forms within the general parametric characteristics described above (examples including (1) a plurality of ribs 60 that extend substantially radially out from the central aperture 56 of the disc and that are substantially equally spaced from one another around the central aperture, (2) an annular ring 60' that is substantially concentric with central aperture 56, and (3) a plurality of bumps 60" that are substantially equally spaced from one another substantially concentrically around central aperture 56), an important factor in reducing the warping phenomenon in accordance with the present invention is limiting the amount of added material to the above-described bounds. A particularly preferred embodiment for achieving this end comprises three equally spaced ribs 60 extending radially out from the central aperture 56 of the disc, adding an amount of material that is about 1–3% of the amount of material forming the clamp area beneath.

It will be understood that the foregoing is only illustrative of the principles of this invention and that various modifications can be made by those skilled in the art without departing from the scope and spirit of the invention.

What is claimed is:

1. An optical disc having a central aperture, a clamp area substantially concentrically surrounding the central aperture, and an information area substantially concentrically surrounding the clamp area, information being recorded on a first surface of the disc in the information area, the disc further having, in the clamp area, a protrusion structure extending above a remainder of the first surface to give the disc a clamping thickness greater than the thickness of a remainder of the disc, a first amount of material forming the protrusion structure being less than about 5% of a second amount of material forming the clamp area excluding the protrusion structure, wherein the protrusion structure has a height above the remainder of the first surface that is approximately equal to the thickness of the remainder of the disc.

2. The optical disc defined in claim 1 wherein the first amount of material forming the protrusion structure is in the range of 1–3% of the second amount of material forming the clamp area excluding the protrusion structure.

3. The optical disc defined in claim 1 wherein the height of the protrusion structure above the remainder of the first surface is approximately 0.6 mm.

4. The optical disc defined in claim 1 wherein the protrusion structure comprises a plurality of ribs extending substantially radially out from the central aperture.

5. The optical disc defined in claim 4 wherein the plurality comprises at least three.

6. The optical disc defined in claim 4 wherein the ribs are substantially equally spaced from one another around the central aperture.

7. The optical disc defined in claim 1 wherein the protrusion structure comprises a ring substantially concentric with the central aperture.

8. The optical disc defined in claim 1 wherein the protrusion structure comprises a plurality of bumps spaced substantially equally from one another substantially concentrically around the central aperture.

* * * * *